Patented Apr. 18, 1944

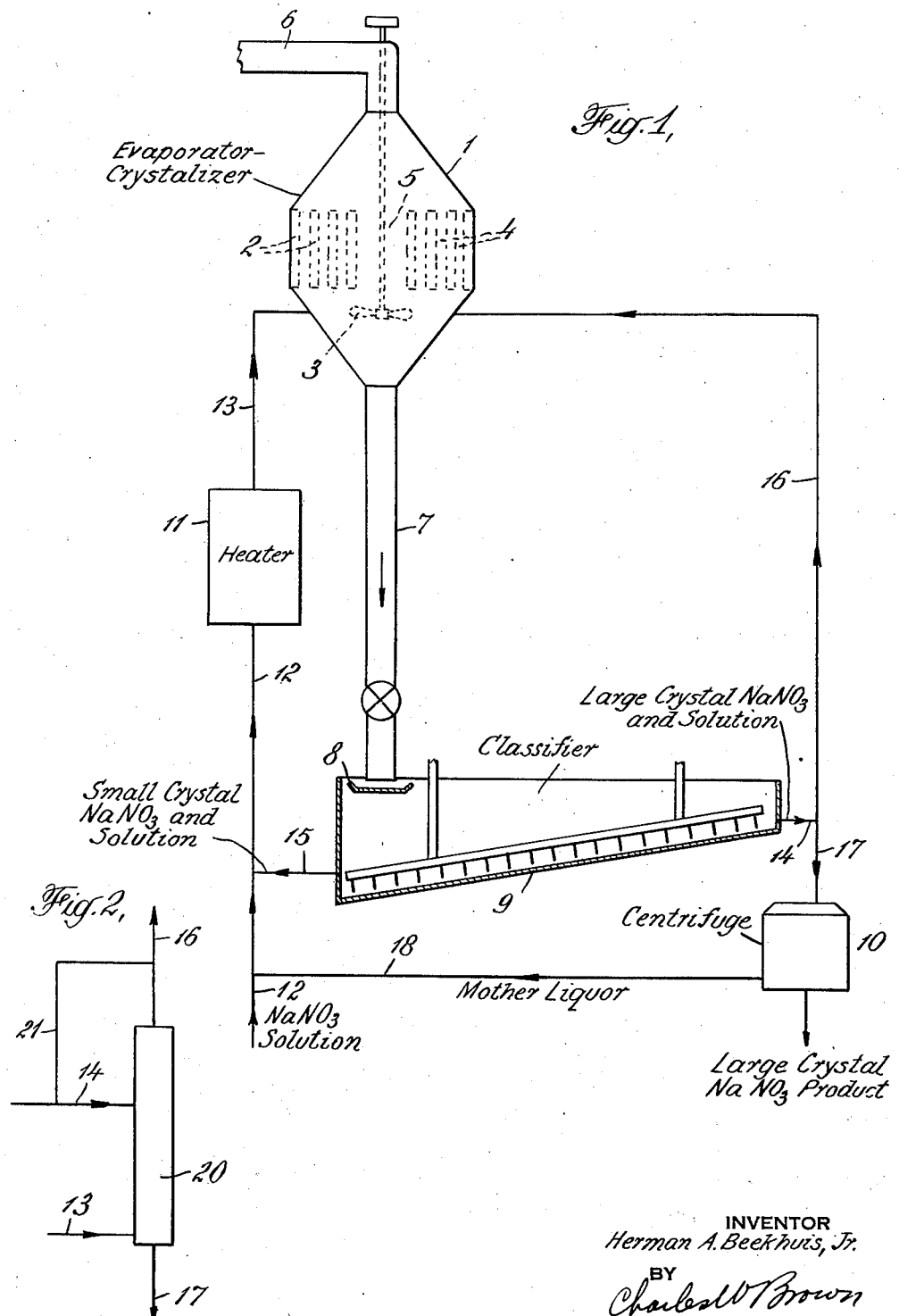

2,347,073

UNITED STATES PATENT OFFICE 2,347,073

PROCESS FOR RECOVERING SOLIDS FROM SOLUTION

Herman A. Beekhuis, Jr., Petersburg, Va., assignor to The Solvay Process Company, New York, N. Y., a corporation of New York Application June 6, 1941, Serial No. 396,911

10 Claims. (Cl. 23—301)

This invention relates to a process for the recovery of a solid material in the form of large, relatively uniformly-sized particles from a solution thereof. The invention is primarily directed to the production of crystals of large and relatively uniform size from solutions.

Numerous procedures have heretofore been proposed for crystallizing materials from solution by methods whereby the size of the crystal product may be increased. Among such procedures are those in which a solution in an evaporator is concentrated to crystallize out solid material under special conditions such that fine crystals are redissolved and the larger crystals are permitted to grow. Methods have also been proposed based on the idea of classifying the crystals either in the evaporator-crystallizer itself or in separate classifiers from which the coarser crystals are taken off as product and the finer crystals are returned to the crystallizer for further growth.

It is an object of this invention to provide a new method for the crystallization of solutions and recovery of the crystal product, whereby a product of particularly large and relatively uniformly-sized particles may be readily and economically produced.

The process of this invention involves crystallizing solid material from a solution of the same in a body of slurry containing solid and mother liquor. Crystals produced by this crystallizing step are withdrawn therefrom and separately and independently of the crystallization step are subjected to wet classification in the presence of the solvent of the solution from which the crystals are deposited. From the classification there is recovered a large crystal fraction and a small crystal fraction. The small crystal fraction is dissolved in whole or in part. The resulting solution, which may still contain a portion of undissolved crystals, is returned to the slurry in which crystallization is accomplished. A portion of the large crystal fraction recovered from the classification step is returned, without being dissolved, into the slurry in the crystallization step. The remaining portion of the large crystal fraction is taken off as product, preferably after separating these crystals from accompanying mother liquor.

I have discovered that by thus separately crystallizing the solid from solution and classifying the solid thus obtained, with return to the crystallizing step both of the small crystal fraction, with re-solution in part or in whole, and of a part of the large crystal fraction, while withdrawing as product only a portion of the large crystal fraction, a product of relatively uniform and large-sized particles or crystals may be readily and economically produced.

In the crystallizing step the slurry in which solid is deposited from solution is vigorously agitated to maintain the solid in suspension in the liquid. The slurry contains at least 20% by volume of apparent solids in order to promote deposition of the solid from solution. I have found it particularly advantageous to maintain in the slurry at least 50% apparent volume of solids. This condition may be readily maintained in the operation of my process by controlling the rates of withdrawing deposits solids from the crystallizing step and return thereto of a portion of the large crystal fraction from the classification step. By maintaining this high proportion of solids to liquor in the crystallizing step and by dissolving a large proportion or all of the small crystal fraction recovered from the classifier and returning the resulting solution to the crystallizing step, particularly favorable conditions are maintained for the production of a product which is relatively uniform in size and of exceptionally large particles.

The term "apparent volume of solids" as used herein refers to the apparent volume occupied by solid settled from a mixture of solid particles and mother liquor as compared with the volume of the supernatant liquid above the settled solid. For any given mixture of solids and liquor in a slurry, the percent apparent volume of solids may be determined by withdrawing a representative sample of the slurry, allowing it to stand in a graduated cylinder until the solids have settled out and then reading the volume (S) of the settled solids, with liquor filling the interstices between the solid particles, and the total volume (T) of material in the cylinder.

$$\frac{S}{T} \times 100 = \text{per cent apparent volume of solids}$$

The following conditions for operation of the process of this invention are given as representing particularly suitable conditions for accomplishing the purposes of the invention:

1. Passing the solids formed in the crystallizing step to the classification step at a rate such that the weight of solids classified per unit time is at least twice and is preferably at least five times the weight of solids produced in the crystallizing step per unit time.

2. So operating the classification step that the cut between the large and small crystal fractions is made in the range of 20 to 200 mesh, preferably in the range of 50 to 100 mesh. For example, the cut is so made that crystals larger than 65 mesh are taken off in the large crystal fraction while crystals smaller than 65 mesh are taken off in the small crystal fraction.

3. The small crystal fraction from the classifier is substantially all dissolved and the resulting solution is returned to the crystallizing step.

4. So correlating the conditions of 1, 2 and 3 above, in carrying out the process that a major portion and preferably 80% or more by number of all the crystals formed in the crystallizing step are taken off in the small crystal fraction from the classifier, redissolved and the resulting solution returned to the crystallizing step.

Operating under these conditions, the crystals formed in the crystallizing step are subjected to repeated classification, with the small crystals being redissolved at an early stage in their growth and the material recrystallized to promote growth of the large crystal product. As a result, a relatively small weight of solid material once crystallized from the solution need be redissolved and recrystallized to promote the growth of another portion of the crystals. The process thus operates efficiently and economically to produce a product of large, uniform particle size.

Inasmuch as the process of this invention does not necessarily depend for successful operation upon a limitation in the number of crystal nuclei formed per unit time in the crystallizing step, any of the various forms of crystallizing evaporators may be employed for carrying out this step of the process. However, the crystallizer is preferably one adapted for handling slurries containing the high proportions of solids preferably present in the liquor in which crystallization takes place. Any of the various types of classifiers available for treating moderately heavy slurries may be employed for the classification step of the process. It is obvious those classifiers which separate cleanly the fines from the coarse crystals are preferable. It is also desirable that a slurry of fines produced by the classifier contain a low percentage of solids if the fines are to be redissolved merely by heating the slurry before return to the crystallizing step. If, on the other hand, the slurry of fines is diluted, for example, by a feed liquor entering the process or by the addition of water to aid in the solution of the fine crystals, the ratio of crystals to liquor withdrawn from the classifier is of little importance.

My invention will be particularly described in connection with the following example for the production of large crystal sodium nitrate employing the apparatus diagrammatically illustrated in Fig. 1 of the accompanying drawing and the modification of that apparatus shown by Fig. 2.

In Fig. 1 of the drawing, 1 is an evaporator-crystallizer of well known type, provided with a heater 2 and a circulator 3 for agitating the contents of the evaporator and circulating them through the tubes 4 of the heater and a central well 5. The steam evaporated from the solution is drawn off through a pipe 6 which connects with a suitable evacuating apparatus for maintaining a desired reduced pressure in the evaporator-crystallizer. Barometric leg 7 serves for withdrawing a mixture of crystals and mother liquor from the evaporator-crystallizer and passing the mixture to the feed trough 8 of a classifier 9. A centrifuge 10 is provided for the separation of mother liquor from crystal product recovered from the classifier. A heater 11 serves for warming the material drawn from the fines end of the classifier, mother liquor from centrifuge 10 and fresh incoming sodium nitrate solution before introducing these materials into the evaporator-crystallizer.

In employing this apparatus for carrying out the process of this invention, sodium nitrate solution containing, for example, 30% $NaNO_3$, is fed through a pipe 12, heater 11 and pipe 13 into evaporator 1 which contains a slurry of sodium nitrate crystals in sodium nitrate mother liquor undergoing evaporation under a pressure of about 1.5 pounds per square inch absolute. Slurry is continuously withdrawn through barometric leg 7 to classifier 9 which separates this material into two fractions of crystals and mother liquor, one containing predominantly coarse crystals is withdrawn through a pipe or other suitable means indicated by 14 and the other containing fine crystals is withdrawn through a pipe or other suitable means indicated by 15. In pipe 12 the small crystal fraction from pipe 15 is mixed with the incoming sodium nitrate solution and with mother liquor from a centrifuge 10. The mixture is heated in heater 11 to redissolve substantially all or all of the crystals and the resulting solution, which may contain residual undissolved crystals, is introduced through pipe 13 into evaporator 1.

The large crystal fraction withdrawn from classifier 9 through pipe 14 is divided into two portions. One portion is returned through pipe 16 to evaporator 1. The other portion is passed through pipe 17 to centrifuge 10 where the crystals and mother liquor are separated. The mother liquor is passed through pipe 18 into pipe 12 and thence returned to evaporator 1. The crystals are withdrawn from centrifuge 10 as the large crystal sodium nitrate product of this process. The ratio of the weight of crystals in the portion of large crystal fraction passed to centrifuge 10 and withdrawn as product of the process to the weight of crystals in the portion of large crystal fraction returned through pipe 16 to evaporator 1, is maintained at about 1 to 5. The percent apparent volume of solids in the slurry in evaporator 1 is maintained at between 50% and 100%, preferably at about 80%, by correlating the rates of withdrawing slurry to the classifier, of introducing sodium nitrate solution through pipe 12, of evaporating water in evaporator 1, and of return of solution of fine crystals from classifier 9, and the proportion of large crystal fraction from classifier 9 which is returned to the evaporator.

The classifier is advantageously operated to make a cut between the coarse and fine crystals at a crystal size (diameter of the crystals) less than one-half and preferably one-quarter or less than that of the average crystal size of the product. Thus, in the process of this example, the classifier may be operated to make the cut at about 65 mesh, crystals larger than this size primarily going into the fraction taken off through pipe 14 and crystals smaller than this size going into the fraction taken off through pipe 15.

The process of this example may be modified in numerous respects without departing from the scope of the invention. For example, a part of or preferably all of the large crystal fraction from classifier 9 which is withdrawn through pipe 14 may be subjected to a second classification. The larger crystals from this second classification are then passed to centrifuge 10 for separation of the crystals from the mother liquor while the smaller crystals, with any portion of the large crystal fraction not subjected to this second classification, are returned through pipe 16 to evaporator 1. In such a modification of the process of the example, the ratios between the amount of large crystal fraction withdrawn to centrifuge 10 from the second classifier to the amount of large crystal fraction returned to evaporator 1 from classifier 9 plus that returned to the evaporator as the smaller crystals from the second classification step, preferably corresponds to the ratios of large crystal fraction drawn to centrifuge 10 through pipe 17 to that returned to evaporator 1 through pipe 16 in the process of the above example in which the large crystal fraction from classifier 9 is not subjected to a second classification.

The process of the above example may be modified by employing clear liquor obtained by redissolving fines from classifier 9 for a second classification of the large crystals drawn from classifier 9 through pipe 14. Such a modification is illustrated in Fig. 2 of the drawing. This figure omits the features common to this modification and to the process of the above example.

With reference to Fig. 2, clear liquor passing through pipe 13 from heater 11 of Fig. 1, is introduced into the bottom of a tower 20 and the large crystal fraction drawn from classifier 9 of Fig. 1 through pipe 14 is introduced to the upper portion of tower 20. A part of the liquid from pipe 13 passes upwardly through tower 20 countercurrent to the crystals from the slurry introduced to the upper portion of the tower which fall downwardly through the tower. This countercurrent flows of liquor and crystals carries upwardly in tower 20 and out through pipe 16 leading from the top of the tower, solution carrying with it any relatively small crystals present in the material introduced from pipe 14. The large crystals falling to the bottom of tower 20 are carried out of that tower through pipe 17 with a portion of the liquid introduced into the tower from pipe 13. This mixture of coarse crystals and liquid is passed through pipe 17 to centrifuge 10 of Fig. 1. It is not necessary that all of the large crystal fraction from classifier 9 be subjected to a second classification in tower 20. Any portion of the large crystal fraction from classifier 9 which is not subjected to further treatment in tower 20, may be by-passed from pipe 14 through pipe 21 to pipe 16. This modification of the process of Fig. 1 is advantageous in that it gives an even more uniformly-sized product. It also permits of utilizing solution from heater 11 to facilitate transfer of a portion of the large crystals from classifier 9 to evaporator 1.

Vigorous agitation of the slurry in which crystallization takes place may be maintained to promote the formation of well developed crystals and decrease the number of nuclei formed and thus decrease the quantity of fine crystals which must be redissolved and recrystallized in order to obtain a large crystal product. A high percentage of solids may be carried in a slurry in the crystallizing apparatus. This also promotes the formation of well developed crystals. Vigorous agitation and a high percentage of solids are inimical to proper operation of a classification procedure. In its turn the classifier may be operated independently of the conditions maintained in the crystallizing step. It is a particular advantage of the process of this invention for the recovery of solid from solution that conditions which are effective for the crystallization of solid from solution may be maintained in the crystallizing step independently of the conditions maintained in the classifying step which are favorable for good operation of that step.

Another important advantage is the feed of material to the classifier, withdrawal as product of a portion of the large crystal fraction, return to the crystallizing step of another portion of the large crystal fraction, and dissolving small crystal fraction from the classifier with return of the resulting solution to the crystallizer may be so correlated that fine crystals formed in the crystallizer are redissolved at an early stage of their growth. Only a small weight of material must then be redissolved in order to grow the remaining crystals to large size for withdrawal as product. In this process the crystals growing to product size are repeatedly classified during their growth and separated from the small crystals which are redissolved. The average age, and thus the average size, of the product crystals is increased as compared with a process in which the crystals are not thus repeatedly classified during growth.

While the foregoing example represents a preferred method for employing my invention in the production of large crystal sodium nitrate, the invention is not limited thereto and its distinctive features may be incorporated in other procedures. For example, a pool of sodium nitrate slurry may be kept agitated and maintained at a temperature of 30° C. 1,000 gallons of a 60% sodium nitrate solution in water at 100° C. is added to this pool of sodium nitrate slurry during the course of four hours while slurry is withdrawn from the pool at a rate of about 40 gallons per minute. The slurry from the pool is passed to a wet classifier in which 95% by weight of the solid sodium nitrate in the slurry is taken off in a coarse crystal fraction and 5% of the solid is taken off in a fine crystal fraction as a slurry of fine crystals in mother liquor containing about 5% by weight of solid. This fine crystal fraction is heated to 50° C. and agitated to dissolve the solid sodium nitrate contained therein. The resulting solution is returned to the pool of sodium nitrate slurry. The coarse crystal fraction from the classifier is divided. One portion, containing solid sodium nitrate equal in weight to that of the sodium nitrate in the solution introduced into the pool of sodium nitrate slurry, is drawn to a centrifuge where the solid is recovered as product. The mother liquor from the centrifuge together with the remaining portion of the coarse crystal slurry from the classifier is returned to the pool of sodium nitrate slurry.

By this procedure a portion of the sodium nitrate contained in the 60% solution supplied to the pool of sodium nitrate slurry may be recovered. By drawing off from the pool of sodium nitrate slurry a part of the nitrate solution and reconcentrating this solution to 60% sodium nitrate, thereby removing an amount of water equal to that previously introduced with the 60% sodium nitrate fed to the pool of slurry, this procedure may then be repeated to recover sodium nitrate from the concentrated liquor together with additional fresh incoming 60% sodium nitrate solution.

I claim:

1. In a process wherein a material is recovered as a solid from solution in a liquid solvent, that improvement which comprises depositing said material as a solid out of solution in said solvent in a body of slurry containing said solution and at least 20% apparent volume of said solid, agitating said body of slurry to maintain the solid particles contained therein in intimate contact with solution from which solid is deposited, withdrawing from said body of slurry a mixture of large and small solid particles formed therein at a rate such that the weight of solid withdrawn per unit time is at least twice the weight of solid deposited in said body of slurry per unit time, subjecting said withdrawn mixture to a wet classification in the presence of said solvent and thereby dividing said mixture into a fine particle fraction and a large particle fraction, the cut between the fine and large particle fractions being made in the range of 20 to 200 mesh, redissolving in said solvent solid contained in said fine particle fraction and returning the resulting liquor to the aforesaid slurry, returning to said slurry a portion of the large particle fraction of said classification in amount sufficient to permit continued withdrawal from the slurry of said mixture of large and small solid particles at the aforesaid rate, and withdrawing another portion of said large particle fraction as product.

2. In a process wherein a material is deposited from solution in a liquid solvent, that improvement which comprises depositing said material as a solid out of solution in said solvent in a body of slurry containing said solution and at least 20% apparent volume of said solid, agitating said body of slurry to maintain the solid particles contained therein in intimate contact with solution from which solid is deposited, withdrawing from said body of slurry a mixture of large and small solid particles formed therein at a rate such that the weight of solid withdrawn per unit time is at least five times the weight of solid deposited in said body of slurry per unit time, subjecting said withdrawn mixture to a wet classification in the presence of said solvent and thereby dividing said mixture into a fine particle fraction and a large particle fraction, redissolving in said solvent solid contained in said fine particle fraction and returning the resulting liquor to the aforesaid slurry, the number of solid particles taken off in said fine particle fraction and redissolved in said solvent being a major portion of the total number of particles of solid deposited from solution in said body of slurry, returning to said slurry a portion of the large particle fraction of said classification and withdrawing another portion of said large particle fraction as product.

3. In a process wherein solid material is crystallized from a solution thereof, that improvement which comprises crystallizing said solid in a body of slurry containing said solution and at least 20% apparent volume of said solid, agitating said body of slurry to maintain the crystals therein in intimate contact with the solution from which solid is crystallized, withdrawing from said body of slurry a mixture of large and small crystals formed therein at a rate such that the weight of crystals withdrawn per unit of time is at least five times the weight of solid crystallized in said body of slurry per unit time, subjecting said withdrawn mixture to a wet classification in the presence of said solvent and thereby dividing said mixture into a fine crystal fraction and a large crystal fraction, the cut between said crystal fractions being made in the range of from 50 to 100 mesh, redissolving in said solvent crystals contained in said fine crystal fraction and returning the resulting liquor to the aforesaid slurry, the number of crystals of said mixture taken off in said fine crystal fraction and redissolved in said solvent being at least 80% of the total number of crystals deposited from solution in said body of slurry, returning to said slurry a portion of the large crystal fraction of said classification and withdrawing another portion of said large crystal fraction as product.

4. In a process wherein a solution of solid material in a liquid solvent is treated to deposit said material as solid from solution in said solvent in a body of slurry of said solid and solution, that improvement which comprises during deposition in said slurry of said material as solid from said solution maintaining in said body of slurry at least 50% apparent volume of said solid and agitating said body of slurry to maintain the solid particles therein in intimate contact with the solution from which the solid is deposited, withdrawing from said body of slurry a mixture of large and small solid particles formed therein, subjecting said withdrawn mixture to a wet classification in the presence of said solvent and thereby dividing said mixture into a fine particle fraction and a large particle fraction, redissolving in said solvent solid contained in said fine particle fraction and returning the resulting liquor to the aforesaid slurry, returning to said slurry a portion of the large particle fraction of said classification and withdrawing another portion of said large particle fraction as product.

5. In a process wherein a solution of solid material in a liquid solvent is treated to crystallize said solid in a body of slurry containing said solution and solid, that improvement which comprises maintaining in said slurry during the crystallization of solid therein at least 50% apparent volume of said solid, agitating said body of slurry to maintain the crystals therein in intimate contact with the solution from which solid is crystallized, withdrawing from said body of slurry a mixture of large and small crystals formed therein at a rate such that the weight of crystals withdrawn per unit of time is at least five times the weight of solid crystallized in said body of slurry per unit time, subjecting said withdrawn mixture to a wet classification in the presence of said solvent and thereby dividing said mixture into a fine crystal fraction and a large crystal fraction, the cut between said crystal fractions being made in the range of from 50 to 100 mesh, redissolving in said solvent crystals contained in said fine crystal fraction and returning the resulting liquor to the aforesaid slurry, the number of crystals of said mixture taken off in said fine crystal fraction and redissolved in said solvent being at least 80% of the total number of crystals deposited from solution in said body of slurry, returning to said slurry a portion of the large crystal fraction of said classification and withdrawing another portion of said large crystal fraction as product.

6. In a process wherein a material is recovered as a solid from solution in a liquid solvent, that improvement which comprises depositing said material as a solid out of solution in said solvent in a body of slurry containing said solution and at least 20% apparent volume of said solid, withdrawing from said body of slurry a mixture of large and small solid particles formed therein, subjecting said withdrawn mixture to a wet classification in the presence of said solvent and thereby dividing said mixture into a fine particle fraction and a large particle fraction, redissolving in said solvent solid contained in said fine particle fraction, passing the resulting solution in countercurrent flow with at least a portion of said large particle fraction and and thereby removing therefrom smaller solid particles in said fraction as a suspension in the solution of the fine particle fraction, returning the resulting mixture of solution and solid particles to said body of slurry and withdrawing as product solid contained in another portion of said large particle fraction after subjecting this last mentioned solid to the aforesaid countercurrent flow with solution of the fine particle fraction.

7. In a process wherein sodium nitrate is crystallized from an aqueous solution thereof in a body of slurry containing said solution, that improvement which comprises maintaining in said body of slurry during crystallization therein of sodium nitrate at least 50% apparent volume of solid sodium nitrate, agitating said body of slurry to maintain the crystals therein in intimate contact with the solution from which sodium nitrate is crystallized, withdrawing from said body of slurry a mixture of large and small crystals formed therein, subjecting said withdrawn mixture to a wet classification in the presence of said solvent and thereby dividing said mixture into a fine crystal fraction and a large crystal fraction, redissolving in said solvent crystals contained in said fine crystal fraction and returning the resulting liquor to the aforesaid slurry, returning to said slurry a portion of the large crystal fraction of said classification and withdrawing another portion of said large crystal fraction as product.

8. In a process wherein solid sodium nitrate is crystallized from an aqueous solution thereof, that improvement which comprises crystallizing said sodium nitrate in a body of slurry containing said solution and at least 20% apparent volume of solid sodium nitrate, agitating said body of slurry to maintain the crystals therein in intimate contact with the solution from which solid is crystallized, withdrawing from said body of slurry a mixture of large and small crystals of sodium nitrate formed therein at a rate such that the weight of crystals withdrawn per unit of time is at least five times the weight of solid crystallized in said body of slurry per unit time, subjecting said withdrawn mixture to a wet classification and thereby dividing said mixture into a fine crystal fraction and a large crystal fraction, the cut between said crystal fractions being made in the range of from 50 to 100 mesh, redissolving at least a portion of the crystals contained in said fine crystal fraction and returning the resulting liquor to the aforesaid slurry, the number of crystals of said mixture taken off in said fine crystal fraction and redissolved in said solvent being at least 80% of the total number of crystals deposited from solution in said body of slurry, returning to said slurry a portion of the large crystal fraction of said classification and withdrawing another portion of said large crystal fraction as product.

9. In a process wherein a material is recovered as a solid from solution in a liquid solvent, that improvement which comprises depositing said material as a solid out of solution in said solvent in a body of slurry containing said solution and at least 20% apparent volume of said solid maintained in intimate contact with the solution, withdrawing from said body of slurry a mixture of large and small solid particles formed therein at a rate such that the weight of solid withdrawn per unit time is substantially greater than the weight of solid deposited in said body of slurry per unit time, subjecting said withdrawn mixture to a wet classification in the presence of said solvent and thereby dividing said mixture into a large particle fraction and a fine particle fraction in which the average size of the particles is less than one-half that of the average size of the particles in the large particle fraction, redissolving in said solvent solid contained in said fine particle fraction and returning the resulting liquor to the aforesaid slurry, returning to said slurry a portion of the large particle fraction of said classification in an amount sufficient to permit continued withdrawal from the slurry of said mixture of large and small solid particles at the aforesaid rate, and withdrawing another portion of said large particle fraction as product.

10. In a process wherein a material is recovered as a solid from solution in a liquid solvent, that improvement which comprises depositing said material as a solid out of solution in said solvent in a body of slurry containing said solution and at least 20% apparent volume of said solid maintained in intimate contact with the solution, agitating said body of slurry to maintain the solid particles contained therein in intimate contact with solution from which solid is deposited, withdrawing from said body of slurry a mixture of large and small solid particles formed therein at a rate such that the weight of solid withdrawn per unit time is substantially greater than the weight of solid deposited in said body of slurry per unit time, subjecting said withdrawn mixture to a wet classification in the presence of said solvent and thereby dividing said mixture into a fine particle fraction and a large particle fraction, the cut between the fine and large particle fractions being made at a point in the range of 20 to 200 mesh at which the average particle size of the solid in said fine particle fraction is no more than one-quarter that of the average particle size of the solid in said large particle fraction, redissolving in said solvent solid contained in said fine particle fraction and returning the resulting liquor to the aforesaid slurry, returning to said slurry a portion of the large particle fraction of said classification in amount sufficient to permit continued withdrawal from the slurry of said mixture of large and small solid particles at the aforesaid rate, and withdrawing another portion of said large particle fraction as product.

HERMAN A. BEEKHUIS, Jr.

CERTIFICATE OF CORRECTION.

Patent No. 2,347,073. April 18, 1944.

HERMAN A. BEEKHUIS, JR.

It is hereby certified that error appears in the printed specification of the above numbered patent requiring correction as follows: Page 1, second column, line 14, for the words "deposits solids" read --deposited solid--; page 3, first column, line 36, for "flows" read --flow--; page 4, first column, line 30, claim 2, for "deposited" read --recovered as a solid--; and that the said Letters Patent should be read with this correction therein that the same may conform to the record of the case in the Patent Office.

Signed and sealed this 13th day of June, A. D. 1944.

Leslie Frazer

(Seal) Acting Commissioner of Patents.